United States Patent
Tumlin et al.

(10) Patent No.: US 6,494,706 B2
(45) Date of Patent: Dec. 17, 2002

(54) OPTICAL ATTENUATOR MOLD

(75) Inventors: Ricky W. Tumlin, Acworth, GA (US); J. Larry Underwood, Woodstock, GA (US)

(73) Assignee: L. L. Culmat, LP, Woodstock, GA (US)

( * ) Notice: Subject to any disclaimer, the term of this patent is extended or adjusted under 35 U.S.C. 154(b) by 1 day.

(21) Appl. No.: 09/837,121

(22) Filed: Apr. 18, 2001

(65) Prior Publication Data

US 2002/0153624 A1 Oct. 24, 2002

(51) Int. Cl.[7] .............................................. B29C 45/36
(52) U.S. Cl. ..................... 425/577; 425/808; 264/328.7
(58) Field of Search ................................ 425/577, 468, 425/808; 249/175; 264/328.7

(56) References Cited

U.S. PATENT DOCUMENTS

| | | |
|---|---|---|
| 4,311,446 A | 1/1982 | Hold et al. |
| 4,531,702 A | 7/1985 | Plummer |
| 4,842,508 A * | 6/1989 | Boskovic ..................... 249/142 |
| 4,900,124 A | 2/1990 | Lampert et al. |
| 4,934,785 A | 6/1990 | Mathis et al. |
| 4,980,115 A | 12/1990 | Hatakeyama et al. |
| 5,082,345 A | 1/1992 | Cammons et al. |
| 5,263,106 A | 11/1993 | Rosson |
| 5,267,342 A | 11/1993 | Takahashi et al. |
| 5,310,331 A * | 5/1994 | Wakebe et al. ................ 249/59 |
| 5,518,671 A | 5/1996 | Takizawa et al. |
| 5,587,116 A | 12/1996 | Johnson et al. |
| 5,701,382 A | 12/1997 | Grois et al. |
| 5,922,266 A | 7/1999 | Grove |
| 6,061,493 A | 5/2000 | Gilliland et al. |
| 6,097,873 A | 8/2000 | Filas et al. |
| 6,254,279 B1 | 7/2001 | Blom |

* cited by examiner

*Primary Examiner*—Jan H. Silbaugh
*Assistant Examiner*—Donald Heckenberg
(74) *Attorney, Agent, or Firm*—Brinks Hofer Gilson & Lione

(57) ABSTRACT

A mold includes a cavity and a core which define a space in which an optical attenuator and supporting portion are formed. The includes a core pin, movably located in the core element. The core pin has a proximal end defining a surface of the lens portion and a distal end remote from the molding space. A core pin motor is coupled to the core pin, through a number of intermediate elements, so that the core pin can be moved relative to the core element to adjust a thickness of the lens portion. The intermediate elements can include a ball screw, a ball screw end cap fixed to a core pin holder block, a ball screw nut fixed to an outer surface of the mold so that an outer end of the ball screw passes through the nut to a location outside the mold.

6 Claims, 5 Drawing Sheets

OPTICAL ATTENUATOR MOLD

BACKGROUND OF THE INVENTION

1. Field of the Invention

This invention relates generally to apparatus for precision molding of optical attenuators and related control apparatus operating as a system and the methods employed by such systems. In particular, this invention relates to a high-precision injection mold having certain adjustment features to control at least one dimension of an injection molded article, and to a control system and methods for controlling the adjustment of the mold so that the molded articles meet defined dimensional criteria.

2. Description of the Prior Art

U.S. Pat. No. 5,082,345 describes a fiber optic connector that includes an optical attenuator element for adding attenuation and reducing return loss in the fiber optic system. The optical attenuator element includes a disk-shaped plate-like lens portion through which light travels from one optical fiber to another length-wise adjacent optical fiber. The lens portion of the optical attenuator element is supported in position by a sleeve of the fiber optic connector that includes a longitudinally extending slot. The attenuator element is generally T-shaped with the stem of the T forming the lens portion and the capital portion of the T forming a head, which is captured in the longitudinally extending slot in the fiber optic connector. To achieve the desired result the lens or disc must be selected of a suitable thickness, flatness, surface finish, and parallelism to maintain fiber-end contact and to provide the desired attenuation. The lens portion of the attenuator generally has a diameter of about 1.25 mm and a thickness which ranges from about 200 to 1750 microns to achieve a 5 dB to a 20 dB loss, respectively. Using polymethylmethacrylate (PMMA) plastic, the attenuator elements can be molded in various thicknesses to attain desired attenuation range, but this requires a high-precision molding system to achieve the desired result. The preferred plastic is Acritherm HS312s PMMA available form ICI Acrylics, Inc.

In practice, the manufacture of such molded optical attenuators presents many difficulties. It is desirable that the lens portion be manufactured to provide attenuators in 1 dB increments, and so labeled, so that the attenuators can be easily and reliably used in the field without the necessity of testing. To achieve the desired reliability, the thickness of the lens portion must be held to about ±1.3 $\mu$m. This close tolerance on thickness is difficult if not impossible using conventional molding techniques since the thermal variations that typically occur during the injection molding process are such as to cause expansion and shrinkage of the molding space by amounts that may be significantly greater than this, depending on the nature of the materials forming the mold.

Additionally, it is desirable to form attenuators down to 1 dB which amounts to a total thickness of only about 50 $\mu$m, which some have characterized a "controlled flashy". The total volume of the attenuator including the head portion is so small that as little as 1.5 mg of plastic forms the entire device, which can amount to one pellet or less of the plastic. Thus the processing practice has been to provide an additional waste part of much larger volume unitarily coupled to the attenuator head portion, which is then removed subsequent to the molding process. It is also desirable, that the formation of the attenuators be achieved in a highly automated process, requiring little human oversight or attention so that the per-unit cost can be held to a minimum.

SUMMARY OF THE INVENTION

Accordingly, a system for molding according to the present invention is intended to produce an optical attenuator that includes a lens portion and a supporting portion unitary with the lens portion. The system includes a molding machine containing a mold in which the attenuator is formed, an extractor robot and optical inspection portion that receives the attenuator following formation, a controller that can be in the form of a programmed general purpose computer that assesses the inspection information received from the optical inspection portion and send control signals to the molding machine and mold.

The mold includes a cavity element and a core element that together define a space in which said supporting portion of the attenuator is formed. A portion of the cavity element also defines one surface of the lens portion of the attenuator. The cavity element and core element are separable from each other by an actuating motor of the molding machine subsequent to each injection cycle to permit removal of each optical attenuator molded between the cavity element and the core element. The mold also includes a core pin, movably located in the core element. The core pin has a proximal end defining a second surface of the lens portion and a distal end remote from the molding space. A core pin motor is coupled to the core pin, through a number of intermediate elements, so that the core pin can be moved relative to the core element to adjust a thickness of the lens portion.

The mold preferably includes a core pin holder block contacting or holding the distal end of the core pin. A ball screw end cap is fixed to the core pin holder block and a ball screw is engaged in the ball screw holder block so that rotation of the ball screw relative to the ball screw end cap causes movement of the core pin holder block to adjust the position of the core pin relative to the core element, and thereby the size of the space in which the lens portion of the attenuator is molded. A first pulley is fixed to the ball screw and a second pulley fixed to the core pin motor. A transmission coupling such as a timing belt couples the first and second pulley so that rotation of the core pin motor is transferred to the ball screw for adjusting the position of the core pin relative to the core element. With a very fine pitch threading on the ball screw, exceptionally small movements can be made in the core pin that are effective to achieve the very close tolerance needed to mold the lens portion of the attenuator.

The extractor is situated adjacent to the molding machine so that it can extract each optical attenuator from the mold at the completion of each molding cycle. The extractor includes an optical measuring device preferably in the form of a laser. The optical measuring device measures at least the thickness of the lens portion and generates an output signal indicative of the measured thickness. Preferably, the measurement is one that tests the attenuation achieved through the lens portion at a specified wavelength.

The controller can be a general-purpose computer such as a p.c. that has an input coupled to the optical measuring device to receive the measurement information derived by that device. The controller has an output coupled to the core pin motor to provide a signal specifying any movement of the core pin motor necessary to achieve a desired thickness of the lens portion. The controller also has a second output coupled to the actuating motor of the molding machine providing a second signal for initiating an injection cycle by the injection molding machine. The controller can, of course, have other connections that may control, for example, the plastic injection temperature, the packing time, the shot size, the mold open and close speed, and coordinate the movements of the extractor with the mold opening. The controller can also use the measured output of the measuring step to control an engraver focused on the supporting portion of the attenuator to engrave a symbol indicative of the measured result of the optical measurement. This information can also be employed to control a sorting mechanism to collect the optical attenuators into prescribed groups based on the result of the optical measurement.

The controller can be supplied with a stepped index or table of optimum thickness values corresponding to selected values of attenuation desired for the lens portion. The index or table can also specify an acceptable value on each side of each step in the stepped index that defines an acceptable range of variability, with values outside the specified range requiring corrective action. The controller preferably includes a comparitor that compares the result of said optical measuring step with a selected one of the stepped index values and associated ranges. The controller then generates a signal to the core pin motor based upon the amount to which the result of said optical measuring step differs from the desired range for the selected stepped index value.

Additional features and advantages will become apparent from the following description of a preferred embodiment of the present invention that references the accompanying drawings.

DESCRIPTION OF THE PREFERRED EMBODIMENTS

Figure 1:
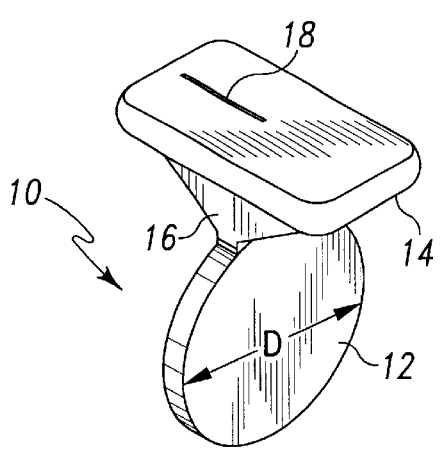
FIG. 1 is a perspective view of an optical attenuator element to be manufactured by the systems and methods of the present invention.
Figure 2:
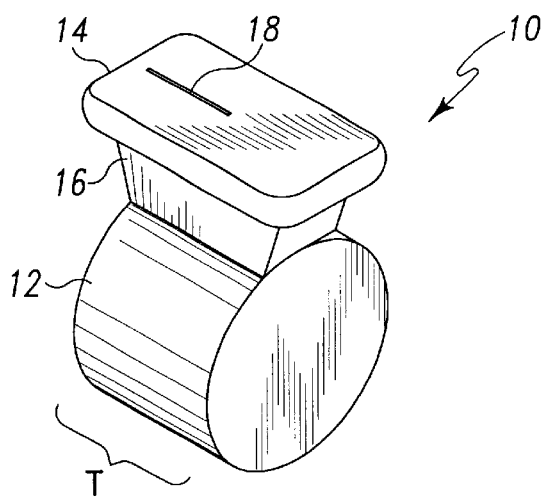
FIG. 2 is a perspective view of another optical attenuator element to be manufactured by the systems and methods of the present invention.
Figure 3:
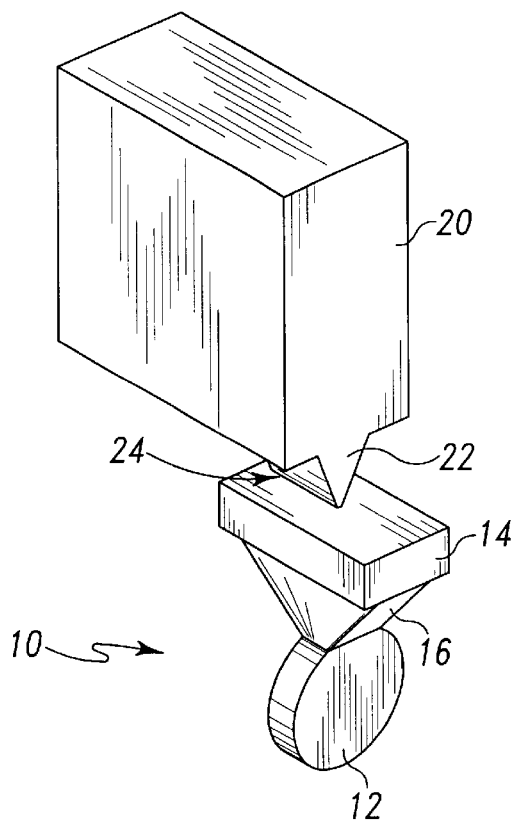
FIG. 3 is a perspective view of an optical attenuator element and associated waste part manufactured by the systems and methods of the present invention.

An optical attenuator 10 of the type manufactured by the system and method of the present invention is shown in FIGS. 1–3. The optical attenuator 10 includes a disk-shaped plate-like lens portion 12 through which, in typical use, light travels from one optical fiber (not shown) to another lengthwise adjacent optical fiber (not shown). The attenuator element 10 can be thought of as generally T-shaped with the stem of the T forming the lens portion 12 and the capital portion of the T forming a head portion 14. The head portion 14 is joined to the lens 12 by a connecting portion 16. Typically, the lens portion of a typical attenuator has a diameter D of about 1.25 mm. The thickness T of the lens portion T can vary considerably as illustrated by comparing FIGS. 1 and 2. The thickness T typically ranges from about 200 microns to about 1750 microns.

The head portion 14 is employed as a holder element to hold the formed attenuator in a holding device such as that shown in U.S. Pat. No. 5,082,345. The head portion 14 is shown to include a line artifact 18 that results from the separation of the attenuator 10 from a block portion 20 shown in FIG. 3 which is formed during the molding process. The block portion 20 forms an element that permits the attenuator portion 10 to be more easily handled during and subsequent to the manufacturing process. The block portion 20 may remain an integral portion of the attenuator element 10 until such time as the attenuator element 10 is actually inserted into the holder designed to couple optical fibers. At that time, the block 20 is then mechanically removed from the head portion 14 through a bending fatigue by rapidly bending the block portion 20 back and forth along the line forming the artifact 18. The block portion is coupled to the head portion 14 by a triangular portion 22 having a linear apex 24.

Figure 4:
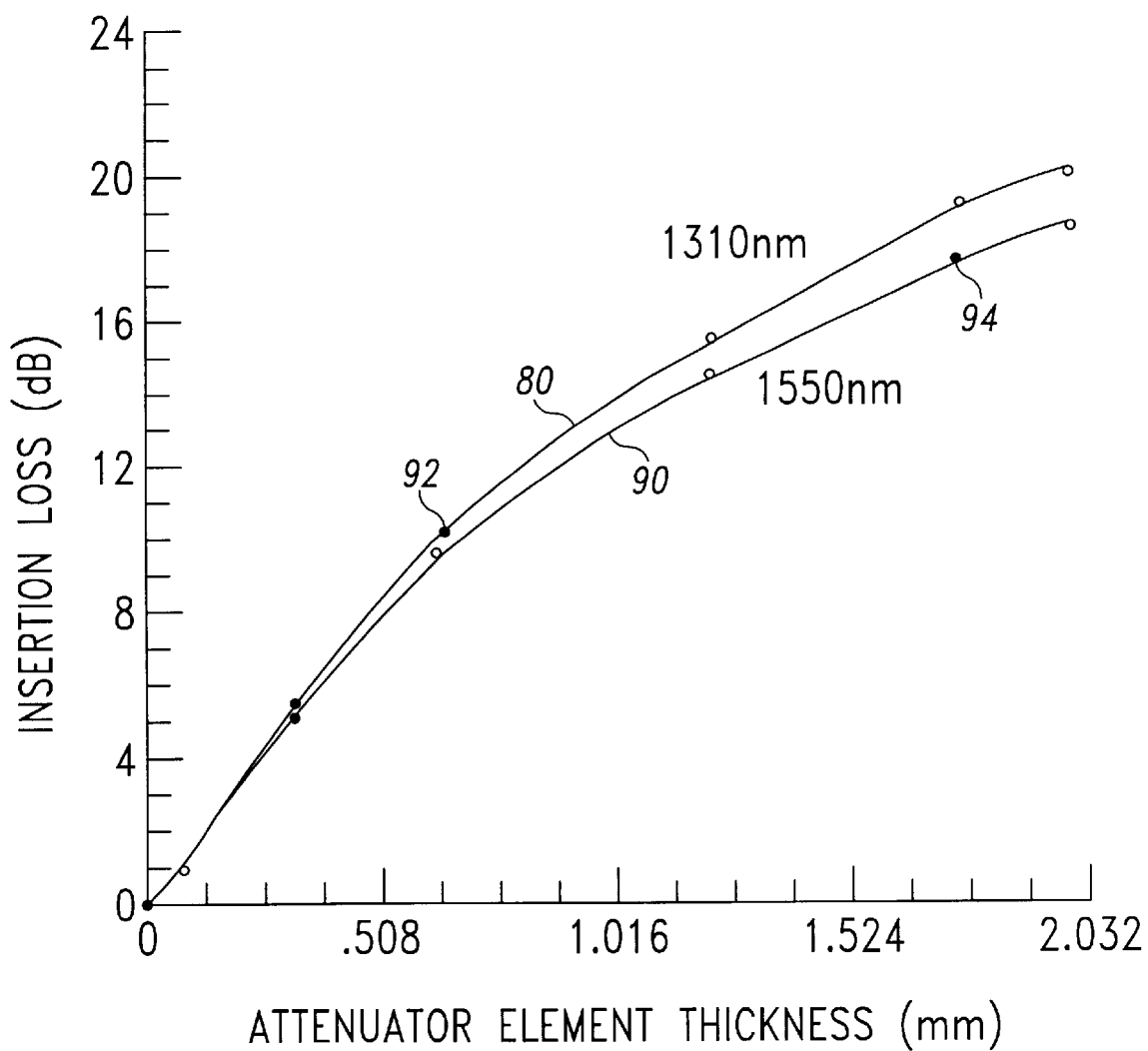
FIG. 4 is a graph of the known relation between the insertion loss measured in decibels and the thickness in millimeters of the lens portion of a PMMA optical attenuator element at various wavelengths.

FIG. 4 is a graph of the known relationship between the thickness T of the attenuator portion 12 and the attenuation or insertion loss that occurs to the laser light passing through the attenuator. The difference between the two lines relates to the wavelength of the light being attenuated by the element 12. When originally adopted, typical attenuators were produced in five decibel increments with a tolerance range of two decibels or less. With the advent of high band width digital communications, closer tolerance is now required. The current requirements are for attenuators produced at one decibel increments with a tolerance of i five percent or less. Thus the thickness of the lens portion 12 of optical attenuators to be produced by the present invention must be held within about ±1.3 micrometers. This extremely close tolerance requirement presents unique molding problems not present during the design and production of such attenuators when they were first introduced into the market. The apparatus and method of the present invention was developed to achieve this extremely close tolerance requirement on a commercial volume of optical attenuators produced in a continuous stream.

Figure 5:
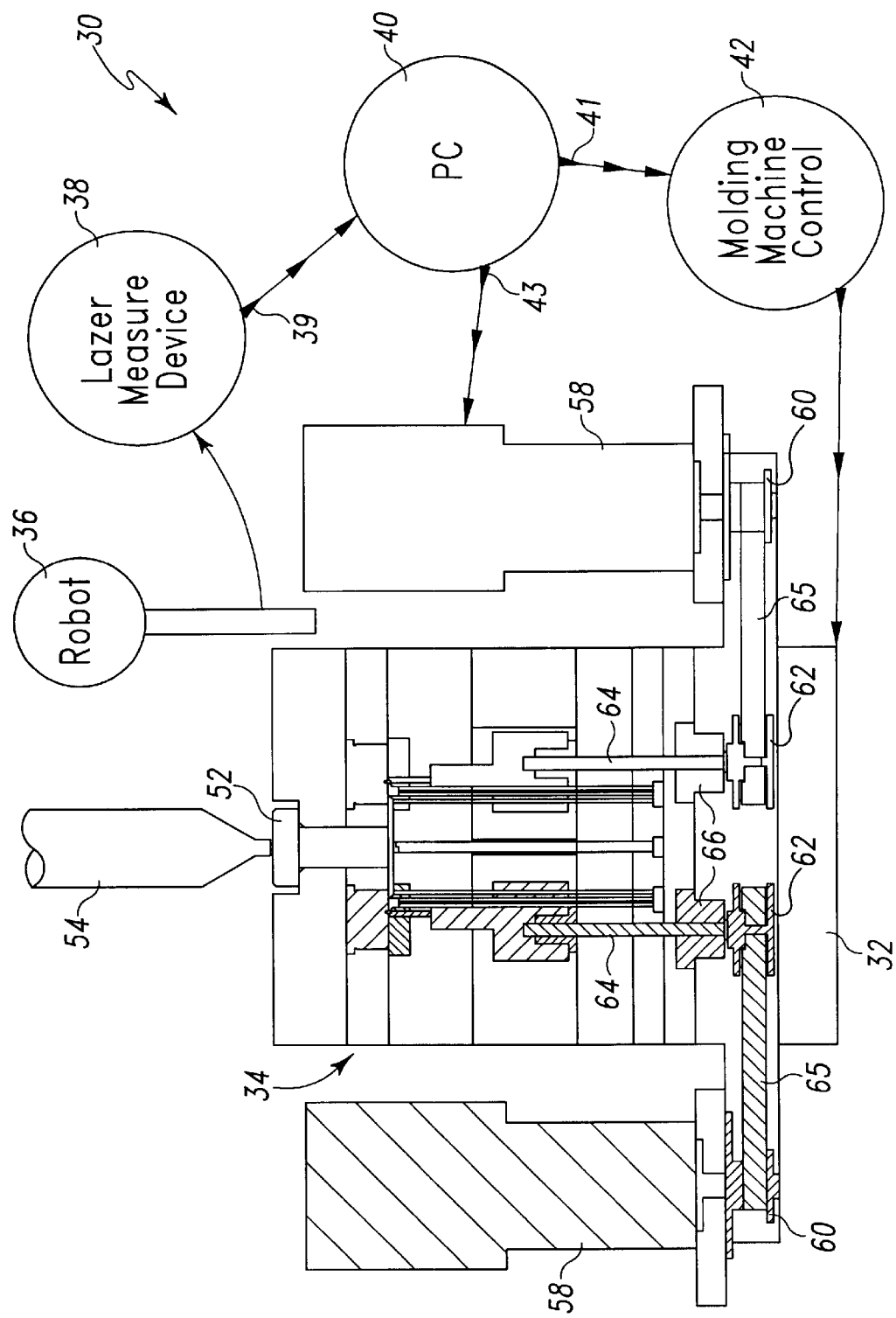
FIG. 5 is a diagrammatic view of an apparatus for molding optical attenuator elements according to the methods of the present invention.

An apparatus in accordance with the present invention for molding optical attenuators 10 within the close tolerance requirements of the industry is shown in FIG. 5. The system 30 includes a molding machine 32 containing a mold 34 in which the attenuators 10 are formed. An extractor robot 36 transfers the formed attenuators from the mold 34 to a laser measuring device 38. The laser measuring device 38 directs a calibrated amount of light through the attenuators extracted from the mold 34 for the purpose of measuring the light loss through the lens portion 12. An output 39 of the laser measuring device 38 is coupled to a general purpose computer 40, such as a PC, that has been programmed to assess the inspection information received from the laser measuring device 38. The computer 40 has an output 41 that provides control signals to the molding machine 32 by way of a control 42. The computer also has an output 43 that provides control signals to the mold 34 so that the mold configuration can be modified to correct any errors detected by the laser measuring device 38 in the attenuators 10 being formed within the mold 34.

Figure 6:
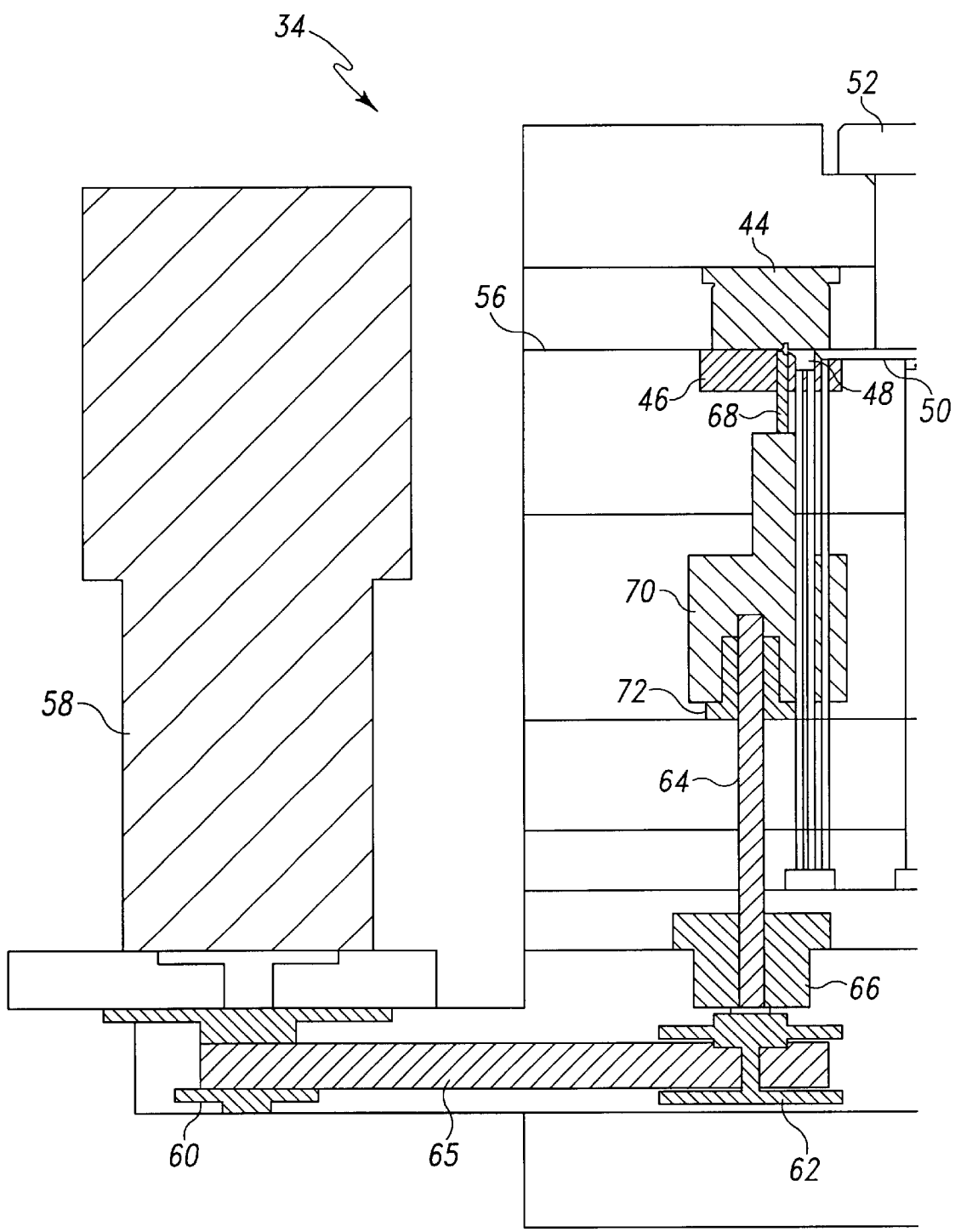
FIG. 6 is an enlarged view of the left portion of the apparatus shown in FIG. 5.

The mold 34 is shown in detail in FIG. 6 to include a cavity element 44 and a core element 46 which, together, define a space 48 in which the attenuator 10 including the support portion 14 and the molding block 20 are formed. The space 48 is coupled by runner 50 to an injection nozzle 52 that receives molten plastic from a plasticating unit 54 of the molding machine 32. The plasticating unit 54 is controlled by molding machine control 42 to inject plastic of a selected volume through nozzle 52 into spaces 48 and 50 on each molding cycle. At the completion of each molding cycle, the mold 34 separates along parting line 56 between the cavity element 44 and the core element 46 by a distance sufficient to permit release of the attenuator 10, including the support portion 14 and the molding block 20, and the runner 50 from the mold, generally as a single piece of coupled elements as previously described. The robot 36 grabs the single piece of coupled elements from the open mold 34 to transport the assembly to the laser measuring device 38. Upon removal of the coupled elements from the mold 34, the mold closes to reestablish the molding space 48. However, before the next molding cycle is initiated by the computer 40, the laser measuring device 38 measures the attenuation produced by the attenuators 10 previously formed and generates an indicative signal. The signal thus generated is employed by the computer 40 to provide a signal at output 43 to the mold 34, and specifically to each core pin motor 58.

Figure 7:
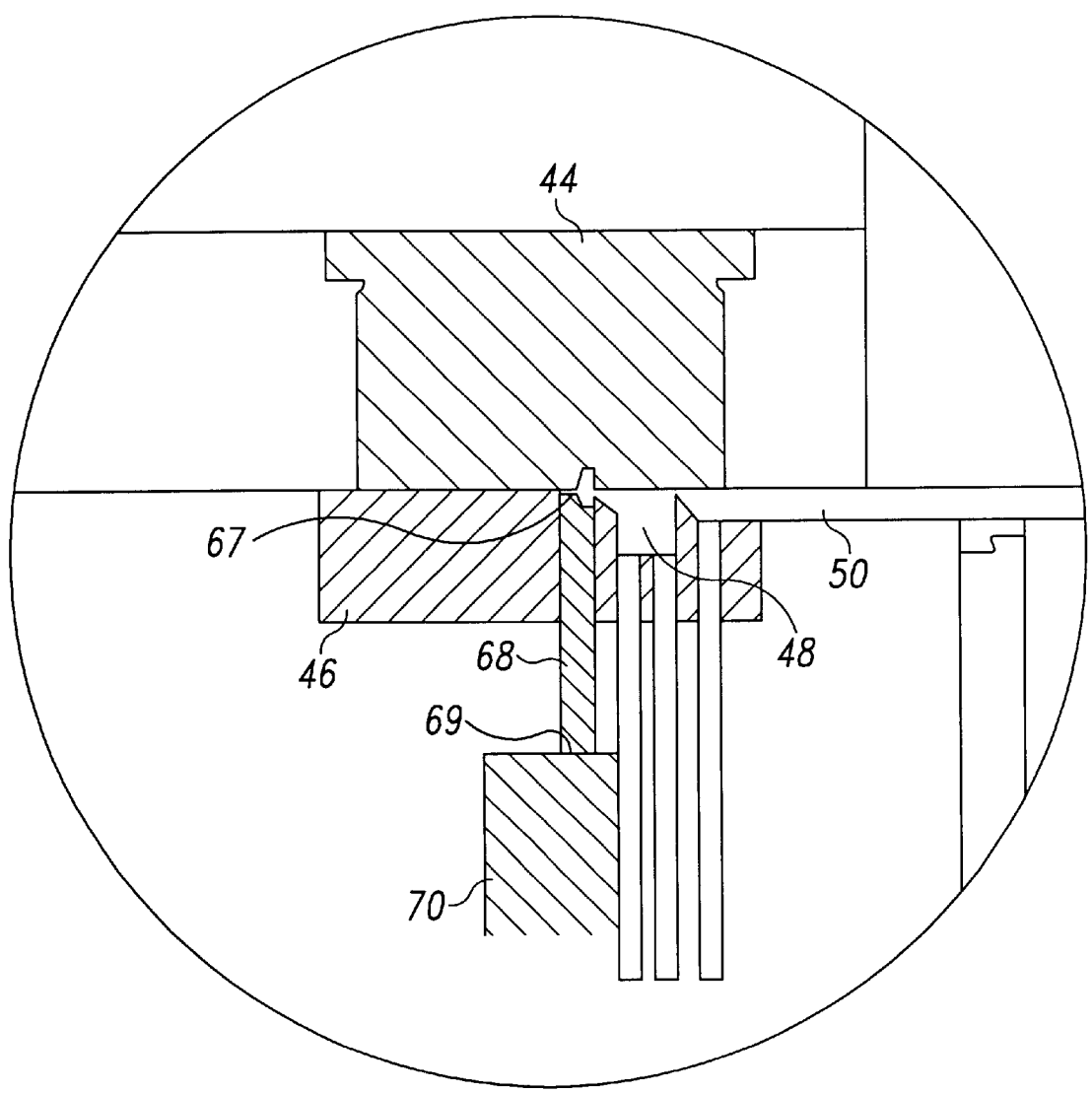
FIG. 7 is a further enlarged view of the mold cavity and related portions of the apparatus shown in FIGS. 5 and 6.

Each of the core pin motors 58 includes a pulley 60 while another pulley 62 is fixed to a ball screw 64. A transmission coupling 65 such as a timing belt couples the pulleys 60 an 62 so that rotation of the core pin motor 58 is transferred to the ball screw 64. The ball screw 64 engages a finely threaded sleeve 66, and rotation of the ball screw 64 by the core pin motor 58 adjusts the position of the ball screw 64. As is seen in even more detail in FIG. 7, the core element 46 includes a core pin 68 having a proximal end 67 movably located in the core element 46. The core pin proximal end 67 defines one surface of the space in which the lens portion 12 of the attenuator 10 is formed. A confronting portion of the cavity element 44 defines the other surface of the lens portion 12 of the attenuator 10. The core pin 68 also includes a distal end 69 remote from the molding space. The core pin motor 58 is coupled to the distal end 69 of the core pin 68, through a number of intermediate elements, so that the core pin 68 can be moved relative to the core element 46 to adjust a thickness of the lens portion 12 of each attenuator 10.

The intermediate elements include a core pin holder block 70 that contacts or holds the distal end 69 of the core pin 68. A ball screw end cap 72 is fixed to the core pin holder block 70 and the ball screw 64 is engaged in the ball screw holder block 72 so that rotation of the ball screw 64 relative to the ball screw end cap 72 causes movement of the core pin holder block 70 to adjust the position of the core pin 68 relative to the core element 46, and thereby the size of the space in which the lens portion 12 of the attenuator 10 is molded. With a very fine pitch threading on the ball screw 64, exceptionally small movements can be made in the core pin 68 that are effective to achieve the very close tolerance needed to mold the lens portion 12 of the attenuator to the exacting specifications of the industry.

Upon completion of any adjustment of the location of the core pin 68 through movement of the core pin motors 58 by the signal at output 43 of computer 40, the mold 34 is caused to be closed by the molding machine control 42 in response to a signal at output 41 of computer 40. The plasticating unit 54 then injects a quantity of molten plastic through injection nozzle 52 into the redefined space 48 to form the next set of attenuators. Thus the dimensions of each set of attenuators formed in the mold 34 is carefully controlled based on measurements performed on the immediately preceding set.

What is claimed is:

1. A injection mold for molding a plastic article, the mold comprising: a cavity element and a core element which together define a space in which said plastic article can be molded, a portion of the cavity element defining a first surface of the molded article, the cavity element and core element being separable from each other subsequent to each injection cycle to permit removal of each article molded between the cavity element and the core element, a core pin movably located in the core element and having a proximal end defining a second surface of the molded article and a distal end, a core pin holder block coupled to the distal end of the core pin, a ball screw coupled to the core pin holder so that rotation of the ball screw causes movement of the core pin holder block to adjust the position of the core pin relative to the core element, a ball screw end cap fixed to the core pin holder block and engaging the ball screw, a ball screw nut fixed to an outer surface of the mold so that an outer end of the ball screw passes through the ball screw nut to a location outside the mold, and a core pin motor coupled to the ball screw for rotating the ball screw so as to adjust a thickness dimension of the molded article between the first and second surfaces.

2. The injection mold of claim 1 further comprising a first pulley fixed to the outer end of the ball screw, a second pulley fixed to the core pin motor, and a transmission coupling the first and second pulley so that rotation of the core pin motor is transferred to the ball screw for adjusting the position of the core pin relative to the core element.

3. The injection mold of claim 2 wherein the transmission coupling the first and second pulley comprises a flexible belt, and wherein the core pin motor comprises a servo motor.

4. A injection mold for molding a plastic article, the mold comprising: a cavity element and a core element which together define a space in which said plastic article can be molded, a portion of the cavity element defining a first surface of the molded article, the cavity element and core element being separable from each other subsequent to each injection cycle to permit removal of each article molded between the cavity element and the core element, a core pin movably located in the core element and having a proximal end defining a second surface of the molded article and a distal end, a core pin holder block coupled to the distal end of the core pin, a threaded element coupled to the core pin holder so that rotation of the threaded element causes movement of the core pin holder block to adjust the position of the core pin relative to the core element, and a core pin motor coupled to the threaded element for rotating the threaded element so as to adjust a thickness dimension of the molded article between the first and second surfaces, the coupling between said core pin holder block and said distal end of the core pin is merely abutment so that rotation of the threaded element in a first direction causes movement of the core pin holder block to adjust the position of the core pin relative to the core element, but rotation of the threaded element in a second direction merely provides a gap between the core pin holder block and the distal end of the core pin so that, upon injection of plastic into said space in which said plastic article can be molded, the core pin will move under influence of the injected plastic to a position wherein said core pin holder block and said distal end of the core pin are again abutting.

5. A mold for molding an optical attenuator that includes a lens portion and a supporting portion unitary with the lens portion, the mold comprising:

a cavity element and a core element which together define a space in which said supporting portion can be molded, a portion of the cavity element defining one surface of said lens portion, the cavity element and core element being separable from each other subsequent to each injection cycle to permit removal of each optical attenuator molded between the cavity element and the core element, a core pin movably located in the core element and having a proximal end defining a second surface of the lens portion and a distal end, a core pin holder block abutting a distal end of the core pin, a ball screw, a ball screw end cap fixed to the core pin holder block and engaging the ball screw, a ball screw nut fixed to an outer surface of the mold so that an outer end of the ball screw passes through the ball screw nut to a location outside the mold, a first pulley fixed to the outer end of the ball screw, a core pin motor, a second pulley fixed to the core pin motor, and a transmission coupling the first and second pulley so that rotation of the core pin motor is transferred to the ball screw for adjusting the position of the core pin relative to the core element so as to adjust a thickness of the lens portion of the optical attenuator while leaving the supporting portion substantially unchanged.

6. The mold of claim 5 wherein the transmission coupling the first and second pulley comprises a flexible belt, and wherein the core pin motor comprises a servo motor.

\* \* \* \* \*